(12) United States Patent
Keshavarzian et al.

(10) Patent No.: US 8,576,785 B2
(45) Date of Patent: Nov. 5, 2013

(54) METHOD OF WIRELESS COMMUNICATION USING AUTHENTICATION INFORMATION

(75) Inventors: Abtin Keshavarzian, Palo Alto, CA (US); Yuan Tian, Mountain View, CA (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 1122 days.

(21) Appl. No.: 12/339,505

(22) Filed: Dec. 19, 2008

(65) Prior Publication Data

US 2010/0157890 A1 Jun. 24, 2010

(51) Int. Cl.
*H04W 4/00* (2009.01)

(52) U.S. Cl.
USPC ............ 370/329; 370/344; 709/206; 709/207

(58) Field of Classification Search
None
See application file for complete search history.

(56) References Cited

U.S. PATENT DOCUMENTS

| | | | | |
|---|---|---|---|---|
| 4,840,602 A * | 6/1989 | Rose | | 446/175 |
| 4,912,762 A * | 3/1990 | Lee et al. | | 705/71 |
| 5,633,931 A * | 5/1997 | Wright | | 713/161 |
| 5,758,087 A * | 5/1998 | Aaker et al. | | 709/232 |
| 6,084,969 A * | 7/2000 | Wright et al. | | 380/271 |
| 6,360,271 B1 * | 3/2002 | Schuster et al. | | 709/231 |
| 6,961,777 B1 * | 11/2005 | Hariharasubrahmanian . | | 709/230 |
| 6,987,853 B2 * | 1/2006 | Uner | | 380/44 |
| 7,099,855 B1 * | 8/2006 | Nelken et al. | | 706/50 |
| 7,340,764 B2 * | 3/2008 | Kubota et al. | | 725/90 |
| 7,346,507 B1 * | 3/2008 | Natarajan et al. | | 704/244 |
| 7,545,768 B2 * | 6/2009 | Haverinen et al. | | 370/328 |
| 8,006,249 B2 * | 8/2011 | Wajs | | 719/313 |
| 2002/0026531 A1 * | 2/2002 | Keane et al. | | 709/250 |
| 2002/0053031 A1 * | 5/2002 | Bendinelli et al. | | 713/201 |
| 2003/0040955 A1 * | 2/2003 | Anaya et al. | | 705/10 |
| 2003/0043744 A1 * | 3/2003 | Lu et al. | | 370/236 |
| 2003/0046238 A1 * | 3/2003 | Nonaka et al. | | 705/51 |
| 2004/0043758 A1 * | 3/2004 | Sorvari et al. | | 455/414.1 |
| 2004/0221295 A1 * | 11/2004 | Kawai et al. | | 719/313 |

(Continued)

FOREIGN PATENT DOCUMENTS

EP    1 432 271 A2    6/2004

OTHER PUBLICATIONS

Wei Ye et al: "An Energy-Efficient MAC Protocol for Wireless Sensor Networks"; Proceedings IEEE Infocom 2002; The Conference on Computer Communications; 21st Annual Joint Conference of the IEEE Computer and Communications Societies, New York, NY; Jun. 23-27, 2002. (10 pages).

*Primary Examiner* — Ian N Moore
*Assistant Examiner* — Dung B Huynh

(57) ABSTRACT

A data communication method includes providing a sender node having a data packet of information. The data packet includes at least one first field and a second field. The second field has content that is dependent upon actual content of the at least one first field. The content of the second field of the data packet is transmitted from the sender node to a receiver node. The receiver node is used to predict the actual content of the first field of the data packet. The receiver node is used to calculate the content of the second field of the data packet based upon the predicted content of the first field. The predicted content of the first field is confirmed to be equivalent to the actual content of the first field. The confirming step includes comparing the calculated content of the second field to the transmitted content of the second field.

20 Claims, 4 Drawing Sheets

(56) References Cited

U.S. PATENT DOCUMENTS

| | | |
|---|---|---|
| 2005/0138379 A1* | 6/2005 | Semple et al. .................. 713/170 |
| 2005/0203582 A1* | 9/2005 | Healy et al. .................... 607/31 |
| 2006/0064458 A1* | 3/2006 | Gehrmann ..................... 709/203 |
| 2006/0224621 A1* | 10/2006 | Findley et al. ................. 707/104.1 |
| 2006/0294182 A1* | 12/2006 | Enomoto et al. ............... 709/203 |
| 2007/0038712 A1* | 2/2007 | Affronti et al. ................. 709/206 |
| 2007/0050455 A1* | 3/2007 | Yach et al. .................... 709/206 |
| 2008/0133929 A1* | 6/2008 | Gehrmann et al. ............. 713/179 |
| 2009/0222524 A1* | 9/2009 | Torsner et al. ................. 709/206 |
| 2009/0228981 A1* | 9/2009 | Shirlen et al. ................. 726/23 |
| 2010/0010989 A1* | 1/2010 | Li et al. ........................ 707/5 |
| 2010/0011220 A1* | 1/2010 | Zhao et al. .................... 713/182 |
| 2010/0211661 A1* | 8/2010 | Morimoto et al. ............. 709/222 |
| 2012/0201381 A1* | 8/2012 | Miller et al. ................... 380/255 |

* cited by examiner

Frame #N

| Function 1 Slots | Function 2 Slots | | | Function 3 Slots |
|---|---|---|---|---|
| | A1 | A2 | ... An | |

FIG. 2

| FCF | NID | Seq # | Src. Addr. | Dest. Addr. | Data Payload | CRC | MAC |

FIG. 3

METHOD OF WIRELESS COMMUNICATION USING AUTHENTICATION INFORMATION

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright© 2008, Robert Bosch GmbH, All Rights Reserved.

BACKGROUND OF THE INVENTION

1. Field of the Invention

The present invention relates to a method for wireless communication, and, more particularly, to a method for wireless communication using authentication information.

2. Description of the Related Art

Many wireless networks deploy authentication mechanisms in order to secure network operation. Data confidentiality and security are crucial for all communication systems. One of the challenges is to ensure and confirm that messages are sent by the actual, legitimate senders that the messages are assumed to come from. This problem is even more challenging in wireless networks wherein all communications are broadcast in nature. Therefore, most wireless networks deploy authentication mechanisms. In these authentication mechanisms, authentication information is derived from original messages using security keys. The authentication messages, normally referred to as Message Authentication Code (MAC) or Message Integrity Code (MIC), are attached as part of the packets, and are transmitted through wireless channels.

A MAC is a short piece of information that authenticates a message. A MAC algorithm may receive as inputs a secret key and message of arbitrary length to be authenticated. The MAC algorithm may output a MAC value, which is sometimes referred to as a tag. The MAC value may protect both the data integrity and authenticity of a message by enabling verifiers also possessing the secret key to detect any changes in the content of the message. An MIC is different from a MAC in that an MIC does not use a secret key in its operation.

Depending on data payload and security strength requirements, MAC length varies. For instance, in IEEE 802.15.4, the MIC can be four, eight or sixteen bytes.

On the other hand, wireless networks operate under other constraints, such as energy consumption and bandwidth allocation in addition to security considerations. These challenges are even more critical in low data rate, battery-driven wireless networks for time-constrained applications, such as building security, industrial control, and automotive networks. Since in wireless networks, data communication may consume the majority of energy, it may be desirable to increase energy efficiency via reducing data communication volume (packet sizes).

What is neither disclosed nor suggested by the prior art is a method of wireless communication in which authentication is ensured but energy consumption and bandwidth requirements are kept at a low level.

SUMMARY OF THE INVENTION

The present invention provides a wireless communication method in which payload data may be derived from authentication information to thereby decrease the volume of other payload data communication. The authentication information is exploited in wireless networks to decrease data communication volume which in turn increases network bandwidth utilization and network lifetime.

The invention comprises, in one form thereof, a data communication method including providing a sender node having a data packet of information. The data packet includes at least one first field and a second field. The second field has content that is dependent upon actual content of the at least one first field. The content of the second field of the data packet is transmitted from the sender node to a receiver node. The receiver node is used to predict the actual content of the first field of the data packet. The receiver node is used to calculate the content of the second field of the data packet based upon the predicted content of the first field. The predicted content of the first field is confirmed to be equivalent to the actual content of the first field. The confirming step includes comparing the calculated content of the second field to the transmitted content of the second field.

The invention comprises, in another form thereof, a data communication method including providing a data packet having an actual payload and a MAC. The MAC is transmitted from a sender node to a receiver node. The receiver node is used to predict the payload before the MAC is received by the receiver node. The receiver node is used to calculate the MAC based upon the predicted payload. The MAC is calculated before the transmitted MAC is received by the receiver node. It is determined whether the predicted payload is equivalent to the actual payload. The determining step includes comparing the calculated MAC to the transmitted MAC.

The invention comprises, in yet another form thereof, a data communication method including providing a sender node having a data packet of information. The data packet includes at least one first field and a second field. The second field has content that is dependent upon actual content of the at least one first field. The content of the second field of the data packet is transmitted from the sender node to a receiver node. The receiver node is used to predict the actual content of the first field of the data packet before the content of the second field of the data packet is received by the receiver node. The prediction is based upon knowledge by the receiver node of prior communications, a lookup table, and/or a formula. The receiver node is used to calculate the content of the second field of the data packet based upon the predicted content of the first field. The content of the second field is calculated before the transmitted content of the second field is received by the receiver node. It is confirmed that the predicted content of the first field is equivalent to the actual content of the first field. The confirming step includes comparing the calculated content of the second field to the transmitted content of the second field.

An advantage of the present invention is that it reduces data communication volume in wireless networks, which consequently decreases communication delay and energy consumption, as well as increases network bandwidth utilization and network lifetime.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2 is a diagram illustrating the format of a frame in the time domain according to one embodiment of a method of the present invention.

FIG. 3 is a diagram illustrating the format of a control data packet in the time domain according to one embodiment of a method of the present invention.

Figure 1:
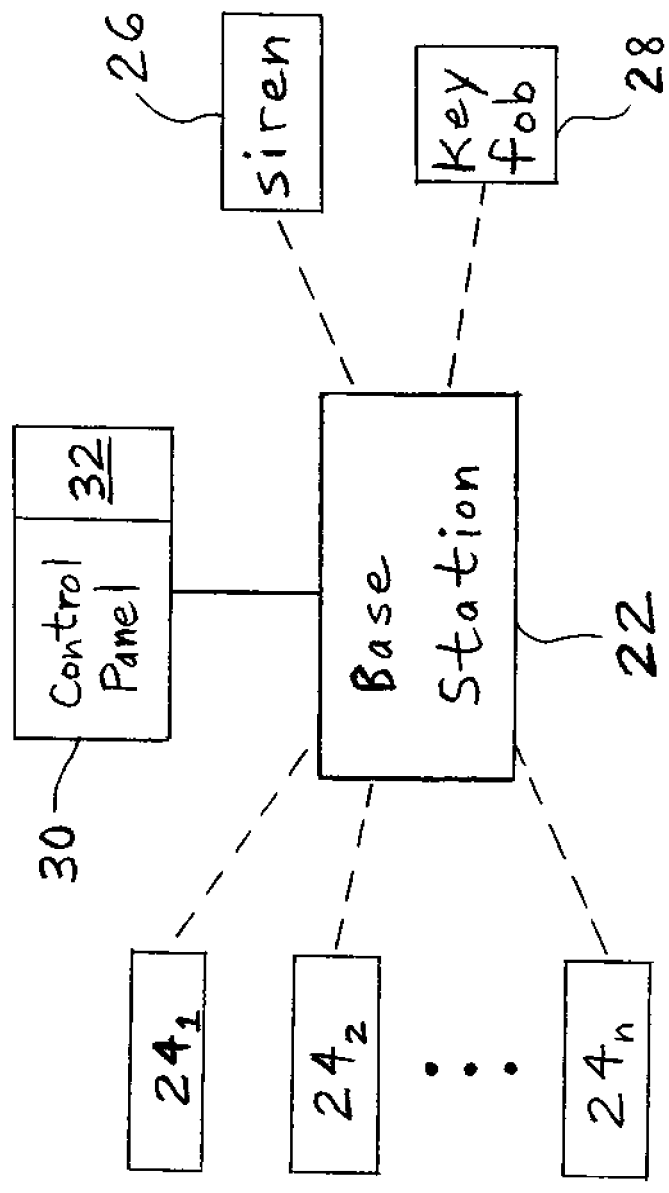
FIG. 1 is a block diagram of one embodiment of a wireless system suitable for use with the method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may be described herein in terms of algorithms and operations on data bits within a computer. It has proven convenient, primarily for reasons of common usage among those skilled in the art, to describe the invention in terms of algorithms and operations on data bits. It is to be understood, however, that these and similar terms are to be associated with appropriate physical elements, and are merely convenient labels applied to these physical elements. Unless otherwise stated herein, or apparent from the description, terms such as "providing", "assigning", "using", "converting", "transmitting", "calculating", "determining", "processing", "selecting", "sending", "receiving", "predicting", "confirming" or "computing", or similar terms, refer the actions of a computing device that may perform these actions automatically, i.e., without human intervention, after being programmed to do so.

Referring now to the drawings and particularly to FIG. 1, there is shown one embodiment of a wireless network 20 suitable for use in conjunction with the communication method of the present invention. Network 20 includes a base station, i.e., hub 22, a plurality of sensors $24_1, 24_2, \ldots, 24_n$, a siren 26, a key fob 28 and a control panel 30 that may include a keypad 32. Control panel 30 may be hard wired to hub 22, while sensors $24_{1-n}$, siren 26 and key fob 28 are in wireless communication with hub 22, as indicated by the dashed lines in FIG. 1.

Base station 22 and control panel 30 may be powered by household alternating current, and sensors $24_1, 24_2, \ldots, 24_n$, siren 26 and key fob 28 may be battery powered. For sensors $24_1, 24_2, \ldots, 24_n$, siren 26 and key fob 28, base station 22 is the gateway to control panel 30, which the user can use to interact with the system. In one embodiment, network 20 is in the form of a wireless Local Security Network (wLSN) system which is a wireless intrusion and alarm system.

The actions of the protocol of the present invention can be divided into steps taken by a sender node, i.e., a node that has a message to send, and steps taken by a receiver node, i.e., a node whose task is to collect these sent messages. For example, a sensor 24 may be a sender node, and hub 22 may be a receiver node. However, it is to be understood that it is possible within the scope of the invention for any of the nodes to be a sender node, a receiver node, or both a sender node and a receiver node, depending upon the particular application. The time may be slotted, and each time slot may be used to exchange one data packet and its acknowledgment between a sender-receiver pair of nodes. All the nodes in the network may be synchronized with each other. For example, a synchronization protocol may be responsible for maintaining a network-wide clock in the system. A simple yet efficient method of keeping the network synchronized may be to periodically broadcast time beacon messages to all nodes from a central node, such as base station 22.

As discussed above, it may be assumed that the nodes of wireless network 20 are synchronized in the time domain. With time synchronization, the nodes may communicate with each other in a frame based manner. Communication may be scheduled frame by frame, and each node may maintain a frame counter. Each frame may be sliced or separated into multiple time slots. A node may be able to transmit only during its assigned time slots. The transmitted data from a node may have one or multiple recipient nodes. Similarly, a node may receive data from other nodes only during predefined time slots. More generally, communication related operations may need to be performed during a node's preassigned time slots.

One specific embodiment of a format of a frame in the time domain is illustrated in FIG. 2. Function1 Slots may be used for header information, Function2 Slots may be used for payload information, and Function3 Slots may be used for acknowledgments. Each of nodes 1 through n is assigned a respective time slot among the Function2 Slots to transmit its payload information to the other nodes.

In wireless network 20, control packets such as supervision and link monitoring packets may be exchanged periodically between the nodes to confirm/monitor proper functioning of the nodes/networks. These packets are generally periodically sent at pre-scheduled times. To avoid malicious attacks, these packets may carry authentication information. Generally, these packets may have the following fields as shown in FIG. 3: Frame Control Field (FCF), Network Id (NID), Sequence Number (Seq. #), Source Address (Src. Addr.), Destination Address (Dest. Addr.), Data Payload, Cyclic Redundancy Check (CRC) and Message Authentication Code (MAC).

These control packets may be needed for proper operations of network 20. Such control packets may compose the majority of communications in network 20, dominate the energy consumption, and have a huge impact on network lifetime.

The format and transmission time of such packets may be pre-scheduled in the network, and the receivers may know when to expect a packet from the senders. Moreover, the data payloads are normally a small fraction of the total packet length. For a wide range of wireless network applications including building security, industrial control and automotive networks, packet data payloads may be one or two bytes, which is the same size or smaller than other packet control overheads, including Frame Control Field (1-2 bytes), Network Id (1-2 bytes), Source Address (1-2 bytes), Destination Address (1-2 bytes), Sequence Number (1-2 bytes), CRC (1-2 bytes), and MAC (2-4 bytes). For such scenarios, the packet payload contents may be fairly predictable by the receiver nodes. For instance, in case of a supervision packet, the fact that a parent node receives supervision packets from its children nodes at specified times may be an indicator of successful supervision. Therefore, the data payload of supervision packets can be zero or empty, and the remaining data fields with FCF indicating a supervision packet may be sufficient to serve the purpose of the supervision packet.

Based upon the above conditions, the method of the present invention may reduce control information communication volume in wireless network 20 via the steps discussed below. First, all control packets may be scheduled to transmit at a given time between specified sender nodes and receiver nodes. Second, when the scheduled communication time approaches, a sender node may feed the whole control packet into an authentication module, and may calculate the Message Authentication Code (MAC). The sender node may then discard the original packet and send only the calculated MAC to the sender node's assigned receivers. Third, before the scheduled communication time arrives, the receiver node may derive, guess at, or otherwise predict the content of the expected packets. The prediction of the content of the expected packets may be based on the receiver node's knowledge of prior packet communications; patterns within the prior packet communications; the contents of a lookup table relating the content of the expected packets to known information; a formula relating the content of the expected packets to known information; and/or the context in which the expected packets are to be received, for example. That is, the receiver node may derive or guess at the content of the FCF, Network Id, Sequence Number, Sender Address, Receiver Address, Data Payload and/or CRC of the expected packets. The scope of the present invention may encompass any technique by which the receiver node may estimate or make an informed guess as to the contents of an expected packet.

After the receiver node ascertains its best guess or otherwise derives the expected contents of the to-be-received data packet, the receiver node may run the same authentication algorithm that the sender node runs. As an output or result of the authentication algorithm, the receiver node may calculate or abstract the MAC of the expected packet based on the receiver node's best guess/derivation of the other fields of the control data packet.

In the event that there are multiple (but still scalable or determinable) possible Data Payloads expected in the data packet, the steps of deriving or guessing at the content of the expected packets and calculating or abstracting the MAC of the expected packet may be iteratively executed or repeated in order to obtain all reasonably expected MACs. That is, the various MACs corresponding to all Data Payloads having a reasonable probability of being included in the data packet may be calculated or abstracted. In one embodiment, a respective MAC is calculated or abstracted for each Data Payload having a probability above a threshold probability value.

All of the above steps of computation may be performed by the receiver node before the scheduled packet transmission time when the central processing unit (CPU) would otherwise be idle. Performing these computation steps before the scheduled packet transmission time may ensure timely recognition of the packet by the receiver node upon reception of the packet by the receiver node.

Upon reception of a message at a scheduled time, the receiver node may compare the message received from the sender node, which may be only a MAC, with the MAC(s) that the receiver node locally calculated. A match between the MAC received from the sender node and a MAC calculated by the receiver node may indicate a successful "reception" of an expected packet. That is, if the MAC calculated by the receiver node is the same as the MAC received from the sender node, then it is known that the actual remainder of the data packet associated with the transmitted MAC is also the same as the derived, guessed at, or estimated remainder of the data packet as determined by the receiver node. If such a match of the total data packet occurs, as indicated by the matching MACs, then consequent actions may be taken by the receiver node depending on the network protocols in use.

If, however, there is no match, i.e., there is a mis-match, between the MAC received from the sender node and a MAC calculated by the receiver node, then a data communication error or a possible malicious communication by an outside sender may be indicated thereby. It is also possible that the receiver node failed to anticipate the contents of the actual data packet that was sent, and thus did not calculate a corresponding MAC that matches the actual MAC. In this case, the receiver node may withhold sending an acknowledgement signal or may otherwise inform the sender node that the message was not successfully received. The sender node may then respond by sending the full data packet instead of only the MAC portion of the data packet to the receiver node.

If the receiver node does not receive any message at the scheduled time, a communication error, node dysfunction, or system collapse may be indicated thereby. In response, the receiver node may take consequent actions depending on the network protocols in use.

The present invention may significantly reduce network traffic created by, or in the form of, control packets. This, in turn, may reduce the energy consumption of battery-powered nodes and thereby prolong the life of these nodes.

The present invention may be employed in wireless networks where information is sent from one node to other nodes in a time division multiple access (TDMA) fashion. The present invention may be especially useful in building security, automotive and industrial control system applications.

According to the present invention, sender nodes may send generated MACs instead of entire data packets. Receiver nodes may predict and generate the content of control packets before actually receiving the messages. The receiver nodes may calculate the MACs based on the predicted contents before actually receiving the messages. The receiver nodes may compare the received MACs with the predicted MACs. A "match" may indicate a successful packet transmission from the legitimate sender with the predicted content. A "mismatch" may indicate a data communication error, a possible malicious communication from an outside sender, or a false prediction of the MAC by the receiver node.

Figure 4:
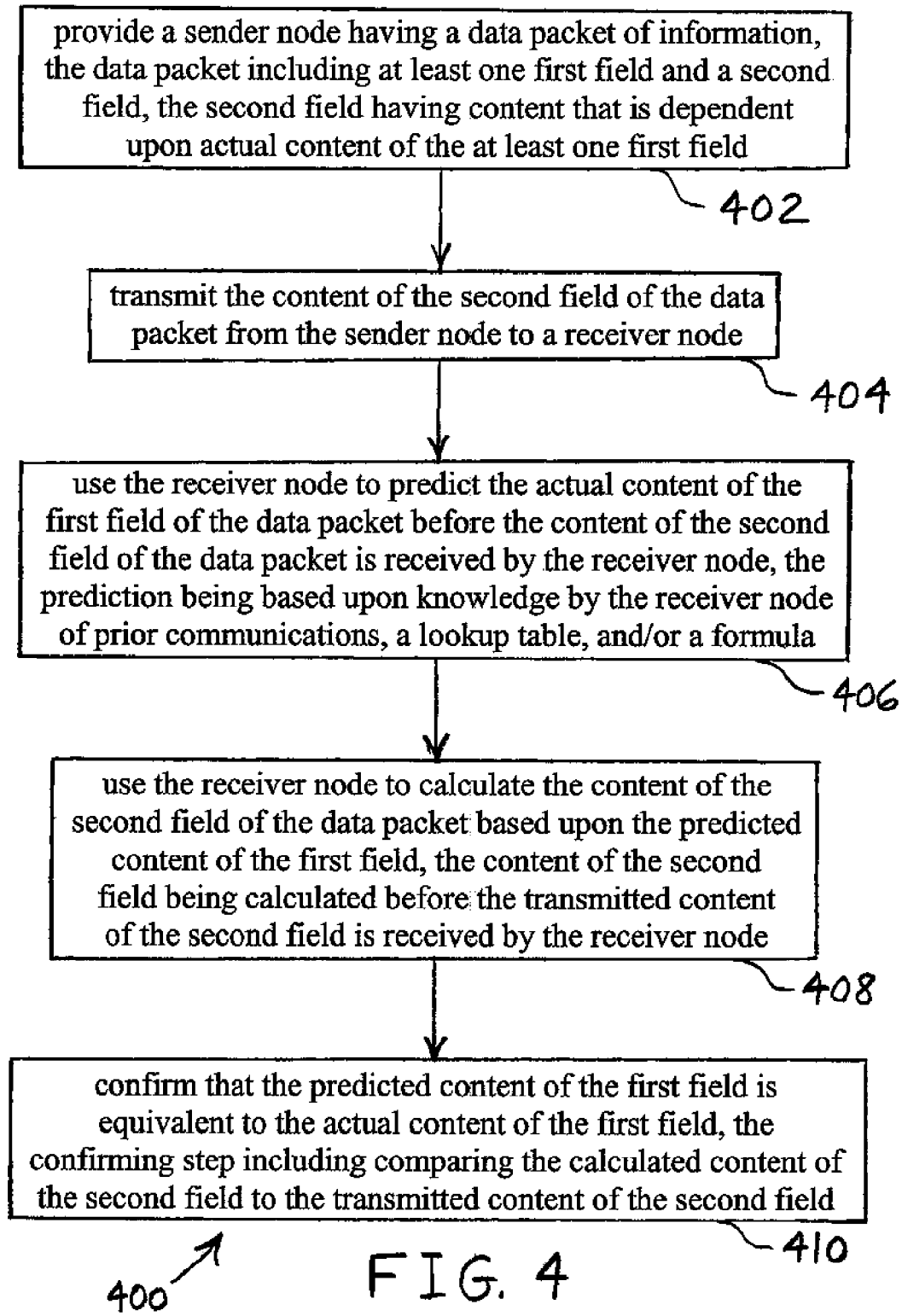
FIG. 4 is a flow chart illustrating one embodiment of a communication method of the present invention.

One embodiment of a communication method 400 of the present invention is illustrated in FIG. 4. In a first step 402, a sender node is provided having a data packet of information. The data packet includes at least one first field and a second field. The second field has content that is dependent upon actual content of the at least one first field. For example, in the embodiment shown in FIG. 1, a sender node 24 may have a data packet of information as shown in FIG. 3. The data packet in FIG. 3 includes first fields FCF, NID, Seq. #, Src. Addr., Dest. Addr., Data Payload and CRC. The data packet also includes a second field in the form of a MAC. The content of the MAC may be calculated with the content of the first fields being used as inputs to the calculation.

In a next step 404, the content of the second field of the data packet is transmitted from the sender node to a receiver node. That is, the MAC may be wirelessly transmitted from a sender node 24 to receiver node 22.

Next, in step 406, the receiver node is used to predict the actual content of the first field of the data packet before the content of the second field of the data packet is received by the receiver node. The prediction is based upon knowledge by the receiver node of prior communications, a lookup table, and/or a formula. More particularly, receiver node 22 may predict the content of each of the first fields FCF, NID, Seq. #, Src. Addr., Dest. Addr., Data Payload and CRC. The prediction may be made before the MAC is received by receiver node 22. Receiver node 22 may base its prediction upon its knowledge of prior communications or prior content of the first fields, a lookup table relating known information to values of the first fields, and/or formulas having known information as inputs and values of the first fields as outputs.

In a next step 408, the receiver node is used to calculate the content of the second field of the data packet based upon the predicted content of the first field, the content of the second field being calculated before the transmitted content of the second field is received by the receiver node. For example, receiver node 22 may calculate the MAC of the data packet based upon the predicted content of the first fields. Receiver node 22 may calculate the MAC before the transmitted MAC is received by receiver node 22.

In a final step 410, it is confirmed that the predicted content of the first field is equivalent to the actual content of the first field. The confirming step includes comparing the calculated content of the second field to the transmitted content of the second field. For instance, receiver node 22 may compare the calculated MAC to the transmitted MAC. If the calculated MAC matches the transmitted MAC, then the receiver node may assume that the receiver node correctly predicted the contents of the first fields FCF, NID, Seq. #, Src. Addr., Dest. Addr., Data Payload and CRC. If, however, the calculated MAC does not match the transmitted MAC, then the receiver node may assume that the receiver node did not correctly predict the contents of the first fields as received. Such a mis-match may be due to a failure to transmit the actual MAC in an error-free manner, a malicious MAC transmission by a sender outside of the network, or a failure of the receiver node to anticipate the possible values of the contents of the first fields. Corrective steps depend upon the protocol being employed in the network, but one possible corrective step is to transmit the entire data packet form the sender node to the receiver node.

While this invention has been described as having an exemplary design, the present invention may be further modified within the spirit and scope of this disclosure. This application is therefore intended to cover any variations, uses, or adaptations of the invention using its general principles.

What is claimed is:

1. A data communication method comprising the steps of:
providing a sender node having a data packet of information, the data packet including at least one first field and a second field, the second field having content that is dependent upon actual content of the at least one first field;
transmitting the content of the second field of the data packet from the sender node to a receiver node;
using the receiver node to predict a plurality of possible actual contents of the first field of the data packet, each of the possible actual contents having a probability above a threshold probability value; and
using the receiver node to calculate a plurality of possible contents of the second field of the data packet based upon respective ones of the predicted possible actual contents of the first field.

2. The method of claim 1 wherein the receiver node predicts the actual content of the first field of the data packet before the content of the second field of the data packet is received by the receiver node, the content of the second field being calculated before the transmitted content of the second field is received by the receiver node.

3. The method of claim 1 wherein the prediction of the plurality of possible actual contents of the first field of the data packet is based upon at least one of knowledge by the receiver node of prior communications, a lookup table, and a formula.

4. The method of claim 1 wherein the content of the second field comprises one of a Message Authentication Code and a Message Integrity Code.

5. The method of claim 1 wherein the content of the first field comprises a payload.

6. The method of claim 1 wherein it is confirmed that the predicted content of the first field is equivalent to the actual content of the first field if the calculated content of the second field matches the transmitted content of the second field.

7. The method of claim 1 wherein the actual content of the first field is not transmitted from the sender node to the receiver node.

8. The method of claim 1 comprising the further step of confirming that one said predicted possible content of the first field is equivalent to the actual content of the first field, the confirming step including comparing the calculated possible contents of the second field to the transmitted content of the second field.

9. A data communication method comprising the steps of:
providing a data packet including an actual payload and a Message Authentication Code (MAC);
transmitting the MAC from a sender node to a receiver node;
using the receiver node to identify a plurality of possible payloads each having a probability above a threshold probability value, the identifying occurring before the MAC is received by the receiver node;
using the receiver node to calculate a respective said MAC for each of the identified possible payloads, the MACs being calculated before the transmitted MAC is received by the receiver node; and
determining whether one of the identified possible payloads is equivalent to the actual payload, the determining step including comparing the calculated MACs to the transmitted MAC.

10. The method of claim 9 wherein the identification of the plurality of possible payloads is based upon at least one of knowledge by the receiver node of prior communications, a lookup table, and a formula.

11. The method of claim 9 wherein it is determined that one of the identified possible payloads is equivalent to the actual payload if one of the calculated MACs matches the transmitted MAC.

12. The method of claim 9 wherein the actual payload is not transmitted from the sender node to the receiver node.

13. The method of claim 9 wherein the sender node and the receiver node are synchronized in the time domain.

14. A data communication method comprising the steps of:
providing a sender node having a data packet of information, the data packet including at least one first field and a second field, the second field having content that is dependent upon actual content of the at least one first field;
transmitting the content of the second field of the data packet from the sender node to a receiver node;
using the receiver node to predict a plurality of possible actual contents of the first field of the data packet before the content of the second field of the data packet is received by the receiver node, each of the possible actual contents having a probability above a threshold probability value, the prediction being based upon at least one of knowledge by the receiver node of prior communications, a lookup table, and a formula;
using the receiver node to calculate a plurality of possible contents of the second field of the data packet based upon respective ones of the predicted possible actual contents of the first field, the plurality of possible contents of the second field being calculated before the transmitted content of the second field is received by the receiver node; and
confirming that one of the predicted possible contents of the first field is equivalent to the actual content of the first field, the confirming step including comparing the calculated possible contents of the second field to the transmitted content of the second field.

15. The method of claim 14 wherein the content of the second field comprises one of a Message Authentication Code and a Message Integrity Code.

16. The method of claim 14 wherein the content of the first field comprises a payload.

17. The method of claim 14 wherein it is confirmed that one of the predicted possible contents of the first field is equivalent to the actual content of the first field if one of the calculated possible contents of the second field matches the transmitted content of the second field.

18. The method of claim 14 wherein the actual content of the first field is not transmitted from the sender node to the receiver node.

19. The method of claim 14 wherein the sender node and the receiver node are synchronized in the time domain.

20. The method of claim 14 wherein the data packet comprises a control packet exchanged periodically between the sender node and the receiver node to one of confirm and monitor proper functioning of a network in which the sender node and the receiver node are disposed.

* * * * *